US006860682B1

(12) United States Patent
Le Picq

(10) Patent No.: US 6,860,682 B1
(45) Date of Patent: Mar. 1, 2005

(54) ELECTRIC DRILL GUIDE APPARATUS

(76) Inventor: Michael W Le Picq, 6915 Sherry Pl., Paso Robles, CA (US) 93446

(*) Notice: Subject to any disclaimer, the term of this patent is extended or adjusted under 35 U.S.C. 154(b) by 245 days.

(21) Appl. No.: 10/200,388

(22) Filed: Jul. 22, 2002

(51) Int. Cl.[7] .......... B23B 45/14
(52) U.S. Cl. .......... 408/112; 408/712
(58) Field of Search .......... 408/110, 111, 408/112, 712

(56) References Cited

U.S. PATENT DOCUMENTS

| | | | | | |
|---|---|---|---|---|---|
| 833,001 | A | | 10/1906 | Press | |
| 1,470,143 | A | * | 10/1923 | Buterbaugh | 408/112 |
| 1,590,643 | A | | 6/1926 | Neuwelt | |
| 1,794,149 | A | * | 2/1931 | Collins | 408/135 |
| 1,895,990 | A | | 1/1933 | Harcharick | |
| 2,454,372 | A | | 11/1948 | Billeter | |
| 2,477,916 | A | * | 8/1949 | Wilhide | 408/136 |
| 2,768,663 | A | * | 10/1956 | Jones | 144/1.1 |
| 2,849,900 | A | | 9/1958 | Heidtman, Jr. | |
| 2,888,965 | A | | 2/1959 | Phillips | |
| 2,997,900 | A | | 8/1961 | Pugsley | |
| 3,464,295 | A | * | 9/1969 | Gallion | 408/112 |
| 3,838,935 | A | | 10/1974 | Boyajian | |
| 3,890,058 | A | | 6/1975 | Self et al. | |
| 4,010,943 | A | | 3/1977 | Eft | |
| 4,072,440 | A | * | 2/1978 | Glover | 408/112 |
| 4,082,474 | A | | 4/1978 | Stiger | |
| 4,242,016 | A | | 12/1980 | Faris | |
| 4,836,720 | A | * | 6/1989 | Hadden | 408/112 |

* cited by examiner

*Primary Examiner*—Daniel W. Howell
(74) *Attorney, Agent, or Firm*—Michael I. Kroll

(57) ABSTRACT

A drill guide has a base plate with a hole for positioning on or above a work piece. A carriage assembly secures the drill with the drill bit disposed over the base plate hole. The carriage assembly telescopes on guideposts with a spring biasing the carriage assembly away from the base plate. An alignment clamp has a compressible element to securely encompass drill chucks of various diameters.

9 Claims, 12 Drawing Sheets

ELECTRIC DRILL GUIDE APPARATUS

BACKGROUND OF THE INVENTION

1. Field of the Invention

The present invention relates generally to drill guide devices and, more specifically, to a drill guide apparatus having a carriage assembly that is slidably mounted onto the base plate guide posts by two spaced apart, spring loaded telescoping guide posts.

2. Description of the Prior Art

There are other devices designed for guiding drills during the operation thereof. Typical of these is U.S. Pat. No. 883,001 issued to Jacob Press on Oct. 9, 1906.

Another patent was issued to A. Neuwelt on Jun. 29, 1926 as U.S. Pat. No. 1,590,643. Yet another U.S. Pat. No. 1,895,990 was issued to E. Harcharik on Jan. 31, 1933 and still yet another was issued on Nov. 23, 1948 to H. R. Billeter as U.S. Pat. No. 2,454,372.

Another patent was issued to M. C. Heidtman, Jr. on Sep. 2, 1958 as U.S. Pat. No. 2,849,900. Yet another U.S. Pat. No. 2,888,965 was issued to C. A. Phillips on Jun. 2, 1959. Another was issued to L. E. Pugsley on Aug. 29, 1961 as U.S. Pat. No. 2,997,900 and still yet another was issued on Oct. 1, 1974 to Alfred Boyajian as U.S. Pat. No. 3,838,935. Another patent was issued to E. L. Self et al. on Jun. 17, 1975 as U.S. Pat. No. 3,890,058. Yet another U.S. Pat. No. 4,010,943 was issued to Sheldon E. Eft on Mar. 8, 1977. On Dec. 30, 1980 U.S. Pat. No. 4,242,016 was issued to B. L. Faris and a patent was issued to D. E. Stiger on Apr. 4, 1978 as U.S. Patent No. 4,082,474.

While these drill guide devices may be suitable for the purposes for which they were designed, they would not be as suitable for the purposes of the present invention, as hereinafter described.

SUMMARY OF THE PRESENT INVENTION

A primary object of the present invention is to provide an apparatus for securing and guiding an electric drill to allow the user to consistently drill perpendicular holes in a workpiece.

Another object of the present invention is to provide a drill guide apparatus having a carriage assembly with multiple clamping means capable of securing a power drill therein and maintaining the position of said drill in respect to the drill guide during the operation thereof even when horizontal, inverted or in any other position required to drill a hole perpendicularly in a surface or a workpiece.

An additional object of the present invention is to provide a drill guide apparatus having a base plate with a hole for allowing the passage of a drill bit therethrough and two spaced apart guide posts extending perpendicularly therefrom and telescopically inserted into the corresponding carriage assembly guide tubes.

A further object of the present invention is to provide a drill guide apparatus wherein each guidepost of the carriage assembly includes a spring element to yieldably bias the carriage assembly away from the base plate.

A still further object of the present invention is to provide a drill guide apparatus wherein the carriage assembly comprises a center plate with an alignment clamp and a top plate parallel to said center plate with said top plate having a drill housing stabilizing clamp.

Another object of the present invention is to provide a drill guide apparatus wherein said alignment clamp has a compression element that can firmly accommodate drill chucks of various diameters.

Still another object of the present invention is to provide a drill guide apparatus wherein the handle stabilizing clamp includes a handle above the top plate having a threaded member positioned through a recess in the top plate and rotatively connected to a clamp member which applies a bias against the drill handle when turned in one direction and relieves the bias when turned in the opposite direction.

Another object of the present invention is to provide a drill guide apparatus that will permit the operator to secure a drill in a carriage assembly so the drill may be locked in the on position thus allowing the operator to drill multiple holes without touching the drill by positioning the drill guide so that the alignment recess is aligned with the area to be drilled and then applying sufficient pressure to the handle to overcome the bias maintaining the carriage assembly away from the base.

A still further object of the present invention is to provide a drill guide apparatus that is simple to use and operate.

A further object is to provide a drill guide apparatus that is inexpensive to manufacture and operate.

Additional objects of the present invention will appear as the description proceeds.

The present invention overcomes the shortcomings of the prior art by providing a drill guide apparatus having a carriage assembly that is yieldably biased away from the base by spring loaded telescoping guide tubes and that can secure an electric drill therein in such a manner that will allow the operator to effectively drill multiple perpendicular holes in surfaces of any orientation without actually touching the drill during operation. The carriage assembly may accommodate drills of various sizes due to the compression element on the center plate alignment clamp.

When using an electric drill it is often difficult for a user to drill a hole perpendicular to the surface of the object being drilled. Numerous electric drill guide presses have been designed to overcome the difficulty of drilling straight holes but the present invention improves upon them by presenting a drill guide apparatus having a moving carriage assembly that uses a double clamp method to secure the drill therein.

My invention provides a power drill guide apparatus for holding and guiding a power drill, the power drill having a handle, chuck, bit, and housing, the housing having a rear portion, the apparatus comprising: a base plate having a hole; a pair of guide posts extending upwardly from the base plate; a pair of guide tubes positioned for telescoping the guide posts; a spring within each guide tube positioned for biasing the guide tubes to an upper position; a center plate connecting the guide tubes, the center plate having an alignment clamp and a notch, the alignment clamp having a notch corresponding with the center plate notch to enclose the drill chuck, the drill housing being supported by the center plate when the drill chuck is so enclosed; a top plate connecting the guide tubes, the top plate having a hole; a stabilizing clamp having a recess, the recess being generally shaped to receive the drill housing rear portion; and a rotation member having a shaft, the shaft being positioned through the top plate hole, the shaft then connecting the rotation member to the stabilizing clamp, such that rotation of the rotation member forces the stabilizing clamp to bear upon the drill housing rear portion, causing the drill to be squeezed between the center plate and the stabilizing clamp; wherein the drill bit is guided through the base plate hole when the top plate is pushed downwardly.

In an exemplary embodiment the top plate has a nut fixed proximate the top plate hole and the rotation member shaft is threaded, such that the rotation member threaded shaft extends through the hole and is threaded through the fixed nut.

In an exemplary embodiment the top plate has a threaded hole and the rotation member shaft is threaded, such that the rotation member threaded shaft extends through the hole and is threaded through the threaded hole.

In an exemplary embodiment the alignment clamp is attached to the center plate with threaded fasteners.

In an exemplary embodiment the center plate notch is generally semi-circular and the alignment clamp notch is generally semi-circular, such that the notches form a circular with a diameter larger than the drill chuck diameter and smaller than the drill housing diameter.

In an exemplary embodiment the alignment clamp is hinged and latched to the center plate such that the alignment clamp swings open for insertion of the power drill chuck.

In an exemplary embodiment the alignment clamp has a compressible element on at least part of the alignment clamp notch.

In an exemplary embodiment the alignment clamp has a compressible element on at least part of the alignment clamp notch and the center plate has a compressible element on at least part of the center plate notch.

In an exemplary embodiment the stabilizing clamp has a compressible element covering at least part of the stabilizing clamp recess.

A power drill guide apparatus is provided for holding and guiding a power drill, the power drill having a handle, chuck, bit, and housing, the housing having a rear portion, the apparatus comprising: a base plate having a hole; a pair of guide posts extending upwardly from the base plate; carriage means for holding the drill with the drill bit positioned above the base plate hole and moving the drill along the guide posts; and bias means for biasing the carriage means along the guide posts away from the base plate; wherein the drill bit is guided through the base plate hole when the carriage means is pushed downwardly.

In an exemplary embodiment the carriage means has alignment means, the alignment means being compressible to adapt to various drill chuck diameters.

The foregoing and other objects and advantages will appear from the description to follow. In the description reference is made to the accompanying drawings, which form a part hereof, and in which is shown by way of illustration specific embodiments in which the invention may be practiced. These embodiments will be described in sufficient detail to enable those skilled in the art to practice the invention, and it is to be understood that other embodiments may be utilized and that structural changes may be made without departing from the scope of the invention. In the accompanying drawings, like reference characters designate the same or similar parts throughout the several views.

The following detailed description is, therefore, not to be taken in a limiting sense, and the scope of the present invention is best defined by the appended claims.

BRIEF DESCRIPTION OF THE DRAWING FIGURES

In order that the invention may be more fully understood, it will now be described, by way of example, with reference to the accompanying FIG. 1 is an illustrative view of the present invention, a hand drill press that assists the user in drilling straight holes within construction materials.

Figure 4:
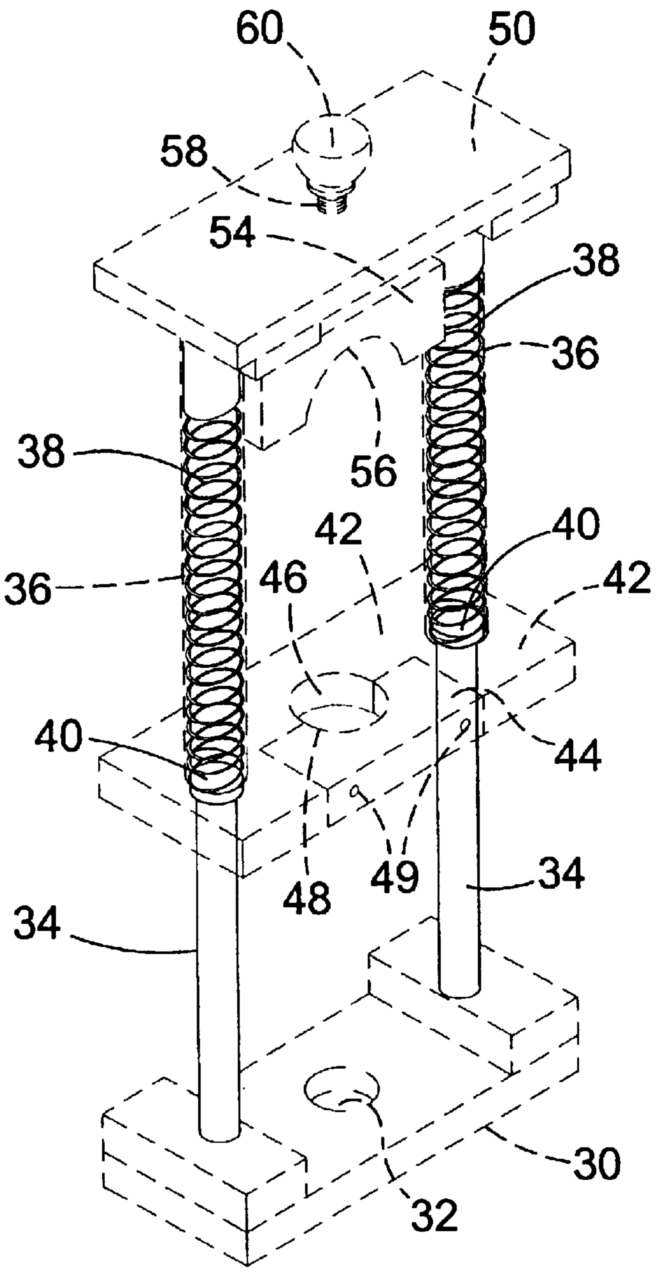

FIG. 4 is a perspective view of the present invention. Shown is a perspective view of the drill press housing in dotted line. Shown in solid line are the spring-loaded guide tube and the guide post. The guide post enters within the upper spring-loaded guide tube post as the drill is lowered to make contact with the material being drilled.

Figure 5:
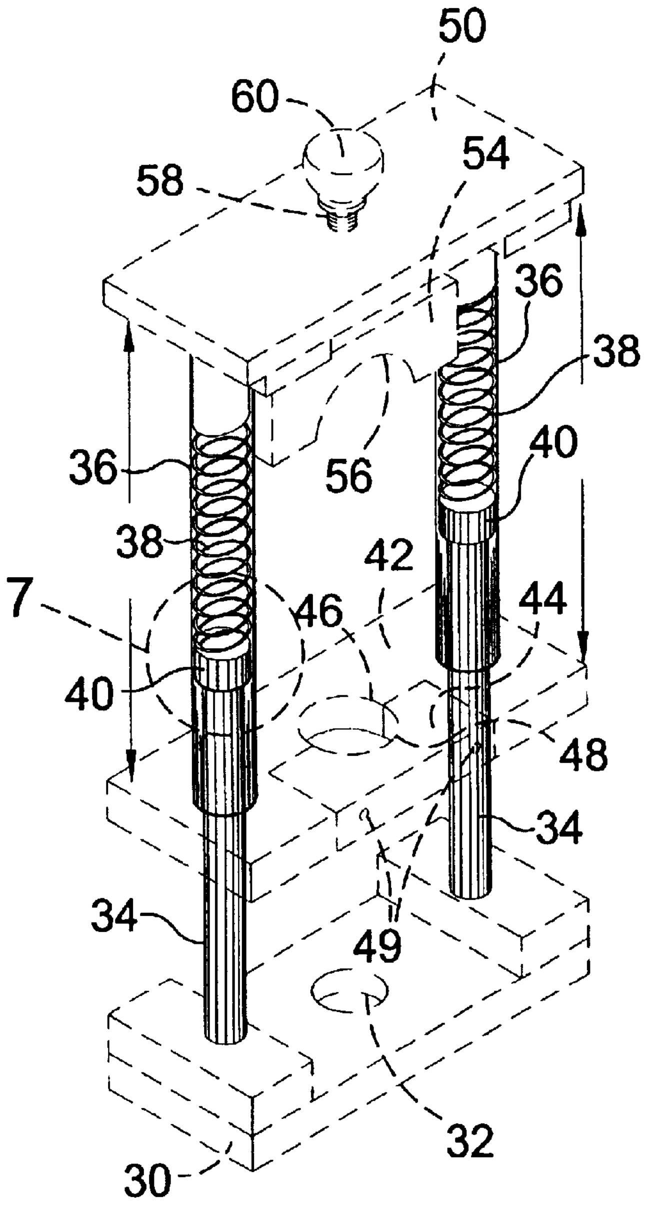

FIG. 5 is a perspective view of the present invention. Shown is a perspective view of the drill press carriage assembly in a down position with the guide post partially within the spring-loaded guide tube.

Figure 6:
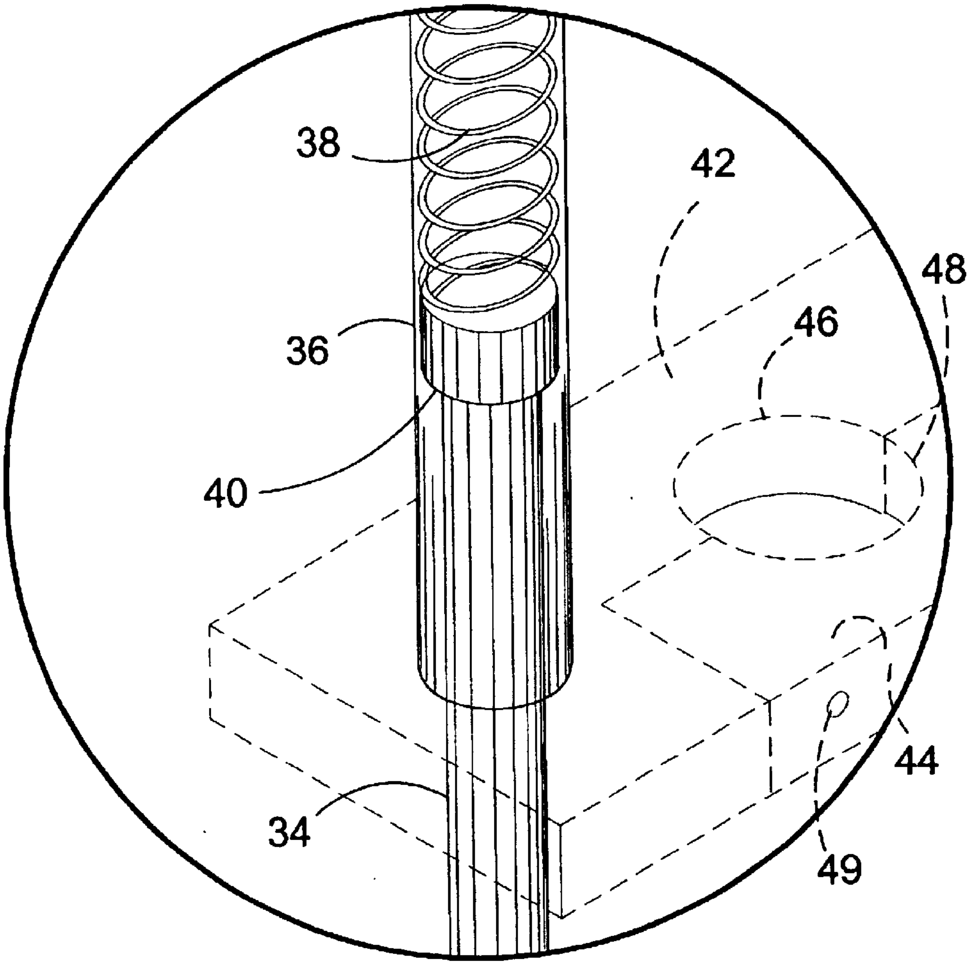

FIG. 6 is a detailed view of a spring-loaded guide tube. Shown is a detailed view with the guide post partially within the spring-loaded guide tube.

Figure 7:
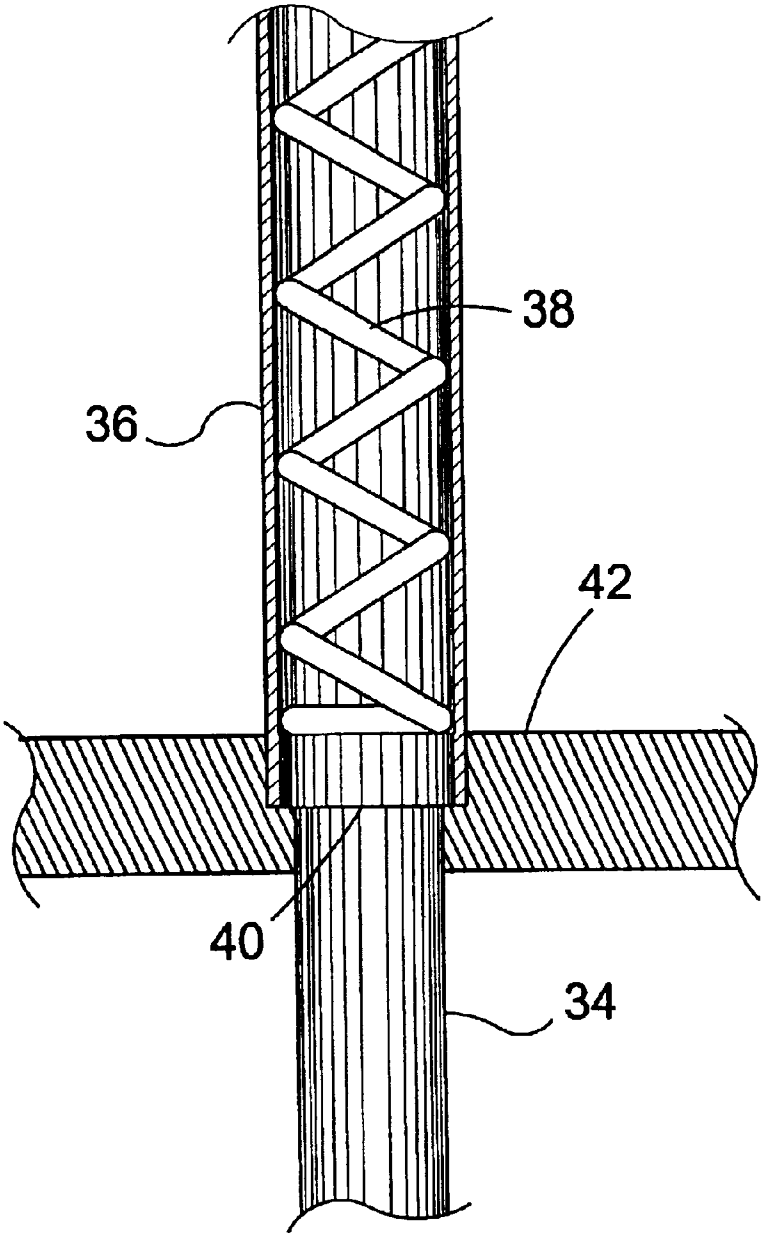

FIG. 7 is a sectional, partial view of the center plate showing the connection of the center plate to one of the guide tubes.

Figure 8:
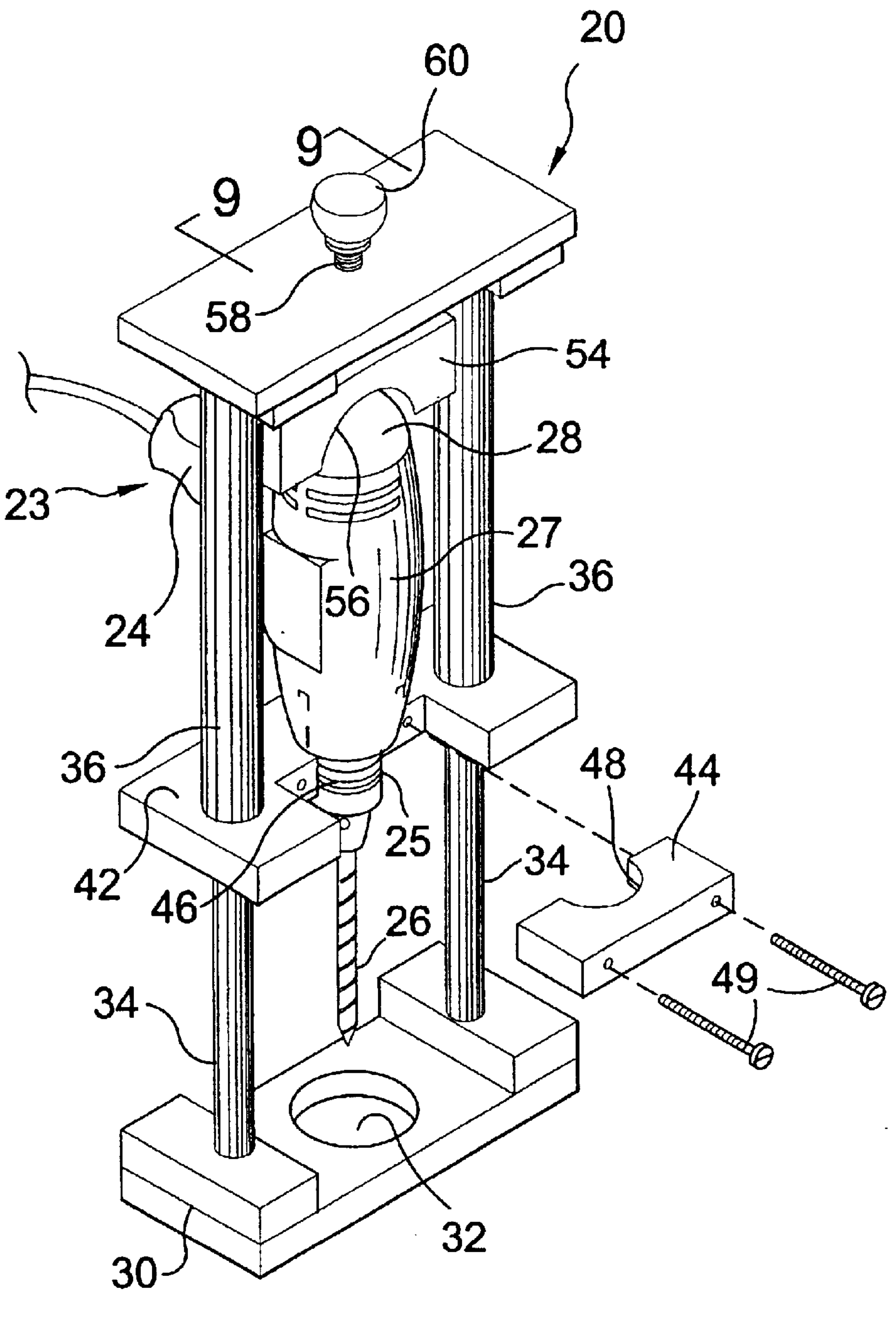

FIG. 8 is a perspective view of the present invention. Shown is the center plate alignment clamp removed from the center plate. The clamp is removing when installing a drill. The clamp retains the drill chuck in a set position to allow for a straight perfect drill hole to be achieved.

Figure 9:
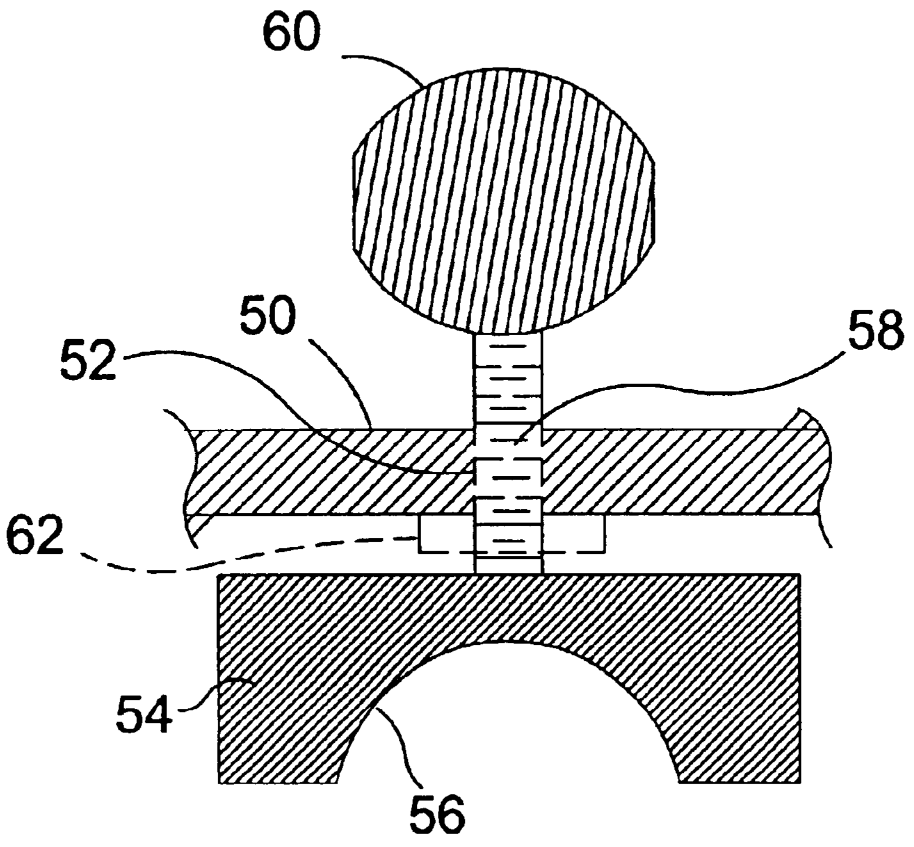

FIG. 9 is sectional view of the top plate, handle, stabilizing clamp, and fixed nut. The clamp assists in retaining the drill housing in a set position to allow for a straight perfect drill hole to be achieved by applying pressure to the drill housing rear portion thereby compressing the drill housing between the stabilizing clamp and the center plate of the carriage assembly.

Figure 10:
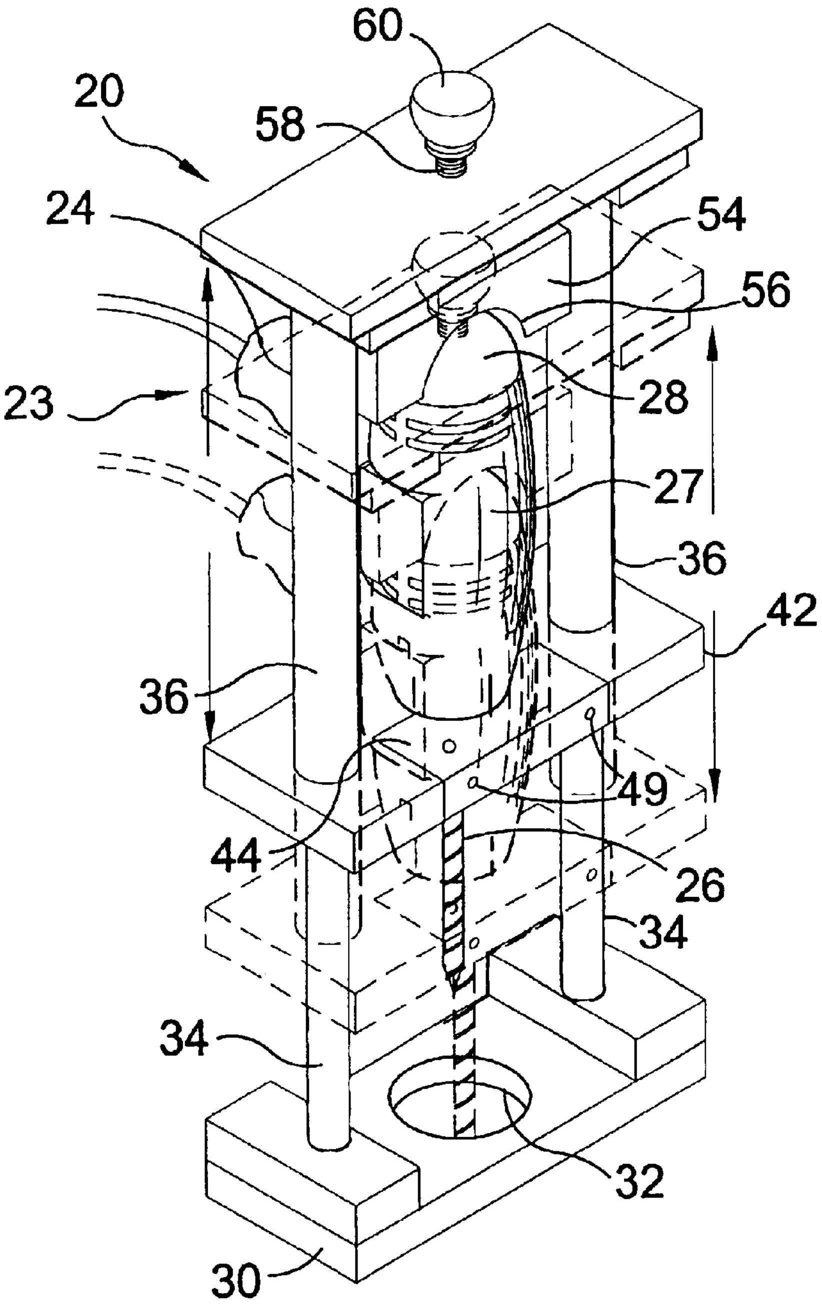

FIG. 10 is a perspective view of the present invention. Shown is a perspective view of the drill press carriage assembly being moved in a downward motion to put the drill bit through the bottom plate hole.

Figure 11:
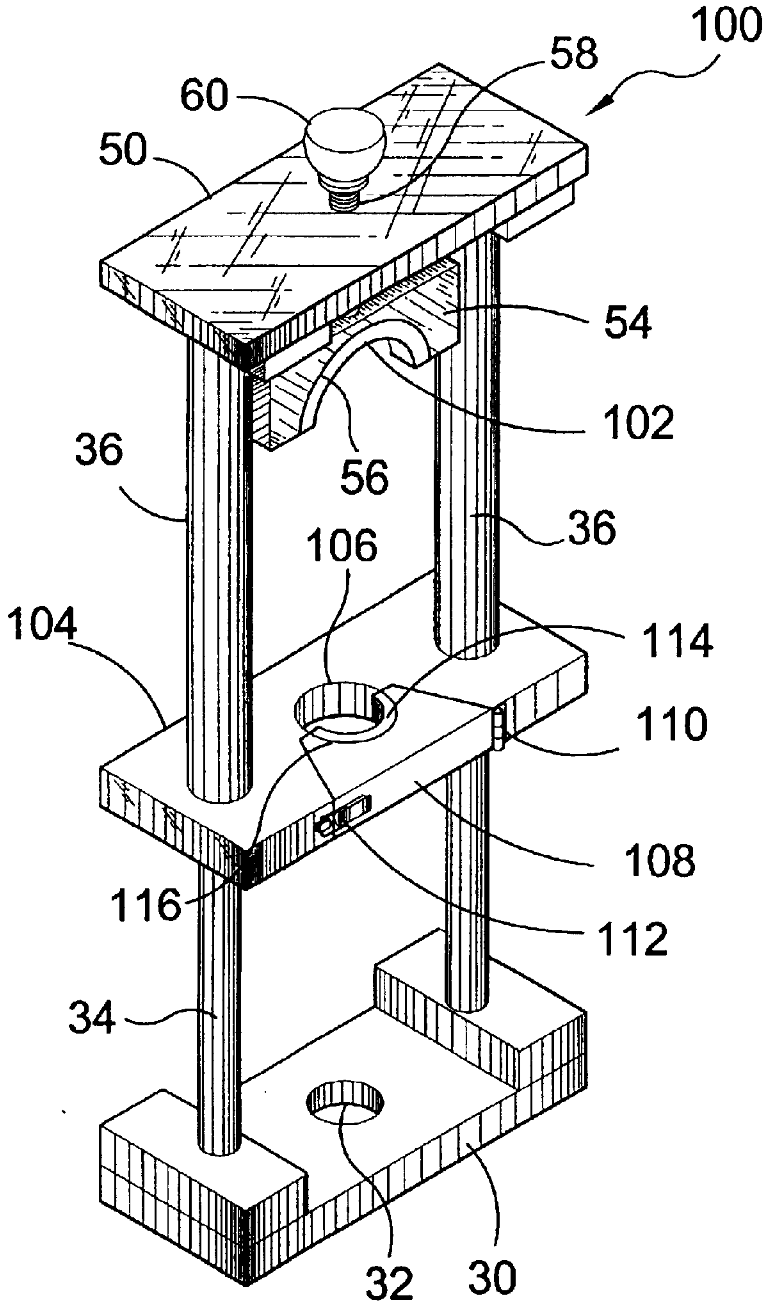

FIG. 11 is a perspective view of an alternate embodiment of the present invention with a hinge and latch alignment clamp design. A rubber compression strip is fixedly attached to the alignment clamp for a firmer grip.

Figure 12:
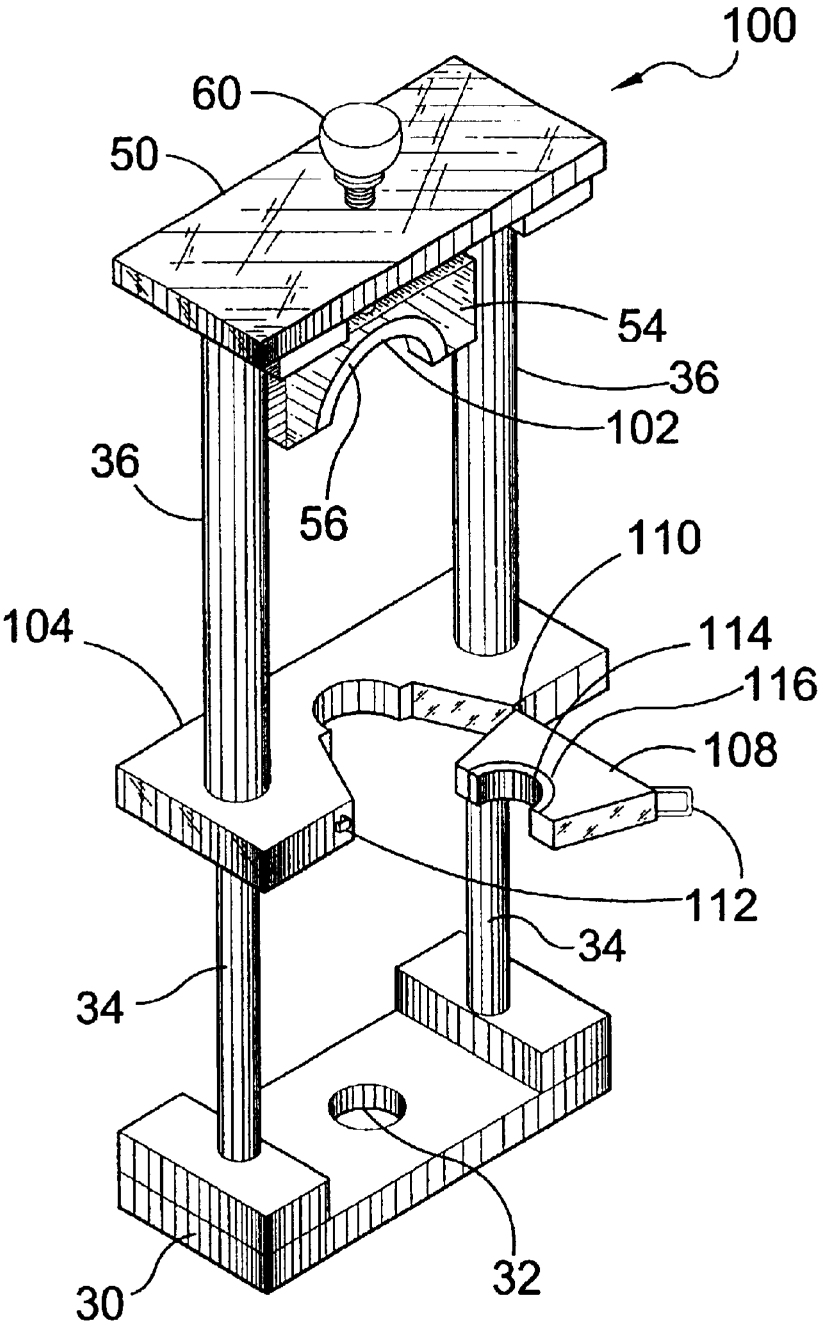

FIG. 12 is a perspective view of an alternate embodiment of the present invention with the hinged alignment clamp in the open position.

DESCRIPTION OF THE REFERENCED NUMERALS

Turning now descriptively to the drawings, in which similar reference characters denote similar elements throughout the several views, the figures illustrate exemplary embodiments of the present invention. With regard to the reference numerals used, the following numbering is used throughout the various drawing figures.

20 Exemplary embodiment of the present invention
21 user
22 surface
23 power drill
24 drill handle
25 drill chuck
26 drill bit
27 drill housing
28 drill housing rear portion
30 base plate
32 base plate hole
34 guide posts 36 guide tubes
38 springs
40 guide posts plunger
42 center plate
44 alignment clamp
46 center plate notch
48 alignment clamp notch
49 threaded fasteners
50 top plate
52 top plate hole
54 stabilizing clamp
56 stabilizing clamp recess
58 threaded shaft
60 rotation handle
62 fixed nut
100 another exemplary embodiment
102 stabilizing clam recess compressible grip element
104 center plate
106 center plate notch
108 alignment clamp
110 hinge
112 latch assembly
114 alignment clamp notch compression element
116 alignment clamp notch

DETAILED DESCRIPTION OF EXEMPLARY EMBODIMENTS OF THE INVENTION

The following discussion describes in detail exemplary embodiments of the present invention. This discussion should not be construed, however, as limiting the invention to those particular embodiments. Practitioners skilled in the art will recognize numerous other embodiments as well. For a definition of the complete scope of the invention, the reader is directed to the appended claims.

Figure 1:
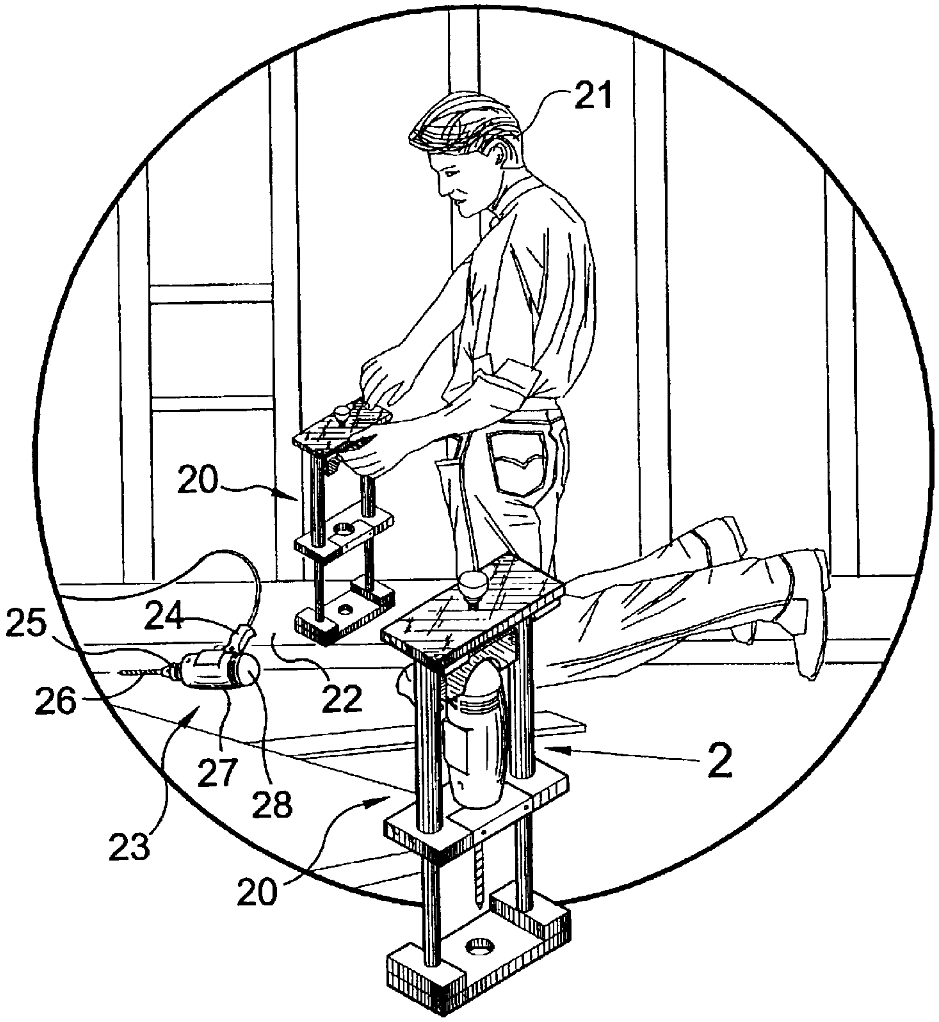

FIG. 1 illustrates the use of the drill guide 20 by a user 21 with the drill guide positioned over a typical surface 22. A typical power drill 23 is shown within the drill guide.

Figure 2:
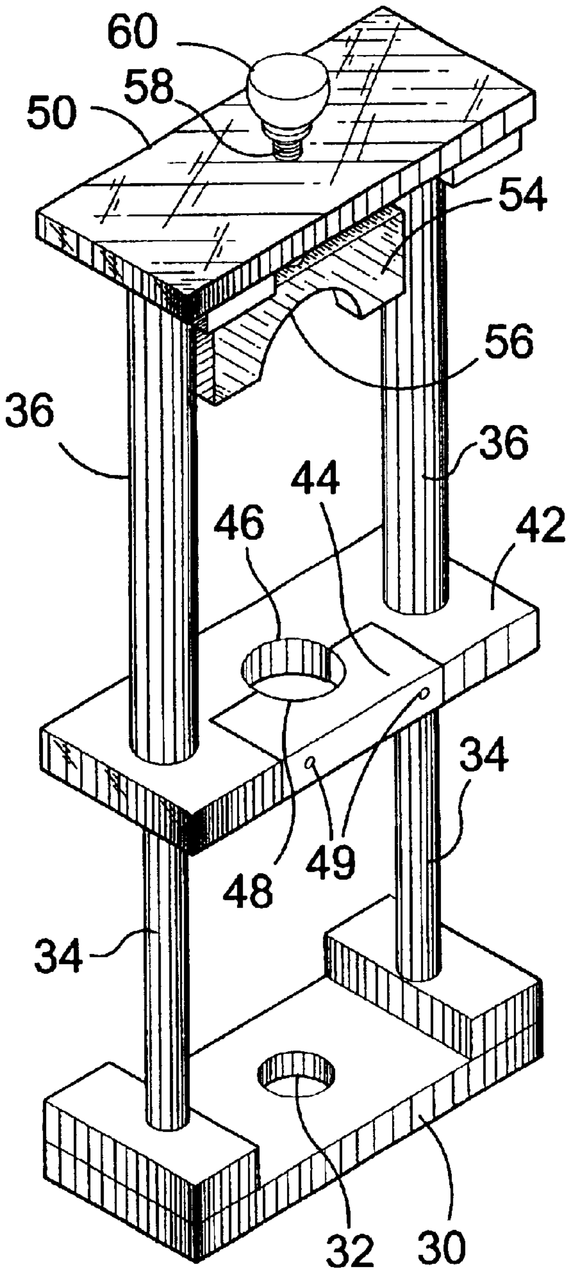
FIG. 2 is a perspective view of the present invention taken from FIG. 1 as indicated.
Figure 3:
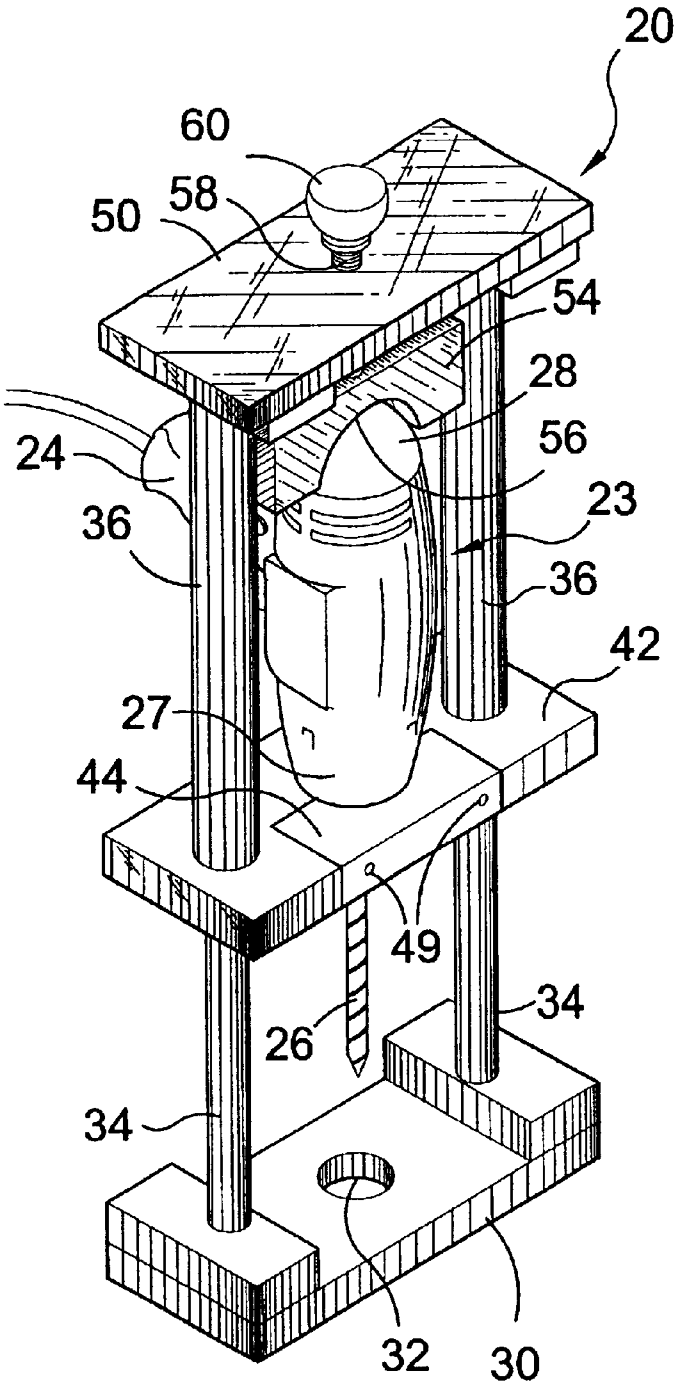
FIG. 3 is a perspective view of the present invention.

Turning now to FIGS. 2–4, an exemplary embodiment of the invention is shown to hold and guide a power drill 23, the power drill having a handle 24, chuck 25, bit 26, and housing 27, the housing having a rear portion 28. The guide 20 has a base plate 30 having a hole 32, and a pair of guide posts 34 extending upwardly from the base plate.

A carriage assembly for the drill 23 includes a pair of guide tubes 36 positioned for telescoping the guide posts 34, and a spring 38 is included within each guide tube and is positioned for biasing the guide tubes to an upper position, away from the base plate 30. As shown in FIGS. 5–7, each spring abuts an enlarged guide post plunger 40 sized to provide a smooth telescoping action of the guide posts 34 through the guide tubes 36.

Turning now to FIG. 8, the carriage assembly of this exemplary embodiment 20 is shown to also include a center plate 42 that connects the guide tubes 36, the center plate having an alignment clamp 44 and a center plate notch 46 of semi-circular shape. In such embodiments, the alignment clamp has a semi-circular notch 48 corresponding with the center plate notch 46 to enclose the drill chuck 25, the drill housing 27 being supported by the center plate when the drill chuck is so enclosed. As shown in FIG. 8, the alignment clamp in such embodiments is attached to the center plate by threaded fasteners 49.

Turning now to FIG. 9 and again to FIG. 8, the above exemplary embodiment 20 is also shown to have a top plate 50 connecting the guide tubes 36, the top plate having a hole 52. A stabilizing clamp 54 with a recess 56 is also included, the recess being generally shaped to receive the drill housing rear portion 28 to provide resistance to lateral movement of the drill housing 27. In this exemplary embodiment 20, the stabilizing clamp is attached by a shaft 58 to a handle 60. The shaft is threaded and is threadably positioned through a fixed nut 62 positioned adjacent to and in alignment with the top plate hole 52. Rotation of the handle in a first direction causes the lowering of the stabilizing clamp such that the stabilizing clamp bears upon the drill housing rear portion, causing the drill to be squeezed between the center plate and the stabilizing clamp. Rotation in a second direction releases the squeeze and the drill housing rear portion can be removed from the stabilizing clamp recess.

Turning again to FIG. 3, the carriage assembly is shown to firmly grasp the drill housing using the stabilizing clamp 54 and the drill chuck 25 using the center plate 42 with the alignment plate 44 attached. When so installed, and as further shown in FIG. 10, the drill bit 26 is guided through the base plate hole 32 when the top plate 50 is pushed downwardly against the springs 38, the guide tubes 36 telescoping downwardly about the guide posts 34. When the pushing pressure ceases, the springs return the carriage assembly to the upper position, i.e. away from the base plate 30.

In embodiments of the type shown in FIG. 10, the spacing between the center plate 40 and the base plate 30 is such that a desirable length of the drill bit 26 can extend below the base plate for penetrating a work piece. In other embodiments, more or less of the drill bit penetrates through the base plate hole 32 by providing guide posts 34 of various lengths.

In another exemplary embodiment, the fixed nut threading function is replaced by threads in the top plate hole. In embodiments of this type, the shaft is threaded through the hole threads. In other embodiments both the fixed nut and a threaded top plate hole are provided.

Turning now to FIG. 11 and FIG. 12, another embodiment of the drill guide 100 is shown to have a compressible grip element 102 adjacent the stabilizing clamp recess 56. The stabilizing clamp recess is thus readily adaptable to drill housing rear portions 27 of various dimensions when the element 102 compresses to accommodate larger drill housing rear portions.

In embodiments of the type shown in FIG. 11 and FIG. 12, the center plate 104 and the center plate notch 106 are modified to accommodate an alignment clamp 108 that is attached to the center plate by a hinge 110 and a latch assembly 112. In such embodiments the alignment clamp swings open and closes on the hinge, and a compressible element 114 is fitted against the semi-circular alignment clamp notch 116. In other embodiments the compressible element is fitted against the center plate notch, or on both the alignment clamp notch and the center plate notch.

With respect to the above description then, it is to be realized that the optimum material and dimensional relationships for the parts of the device 20, will include variations in size, materials, shape, and form, which will occur to those skilled in the art upon review of the present disclosure. For example, various woods, metals, and plastics can be used for the plates, clamps, posts and tubes, and rubber or other resilient materials can be used for the compressible elements.

All equivalent relationships to those illustrated in the drawings and described in the specification are intended to be encompassed by the present invention.

What is claimed as new and desired to be protected by Letters Patent is set forth in the appended claims:

1. A power drill guide apparatus for holding and guiding a power drill, the power drill having a handle, chuck, bit, and housing, the housing having a rear portion, the apparatus comprising:

a base plate having a hole;

a pair of guide posts extending upwardly from the base plate;

a pair of guide tubes positioned for telescoping the guide posts;

a spring within each guide tube positioned for biasing the guide tubes to an upper position;

a center plate connecting the guide tubes, the center plate having an alignment clamp and a notch, the alignment clamp having a notch corresponding with the center plate notch to enclose the drill chuck, the drill housing being supported by the center plate when the drill chuck is so enclosed;

a top plate connecting the guide tubes, the top plate having a hole;

a stabilizing clamp having a recess, the recess being generally shaped to receive the drill housing rear portion; and a rotation member having a shaft, the shaft being positioned through the top plate hole, the shaft then connecting the rotation member to the stabilizing clamp, such that rotation of the rotation member forces the stabilizing clamp to bear upon the drill housing rear portion, causing the drill to be squeezed between the center plate and the stabilizing clamp;

wherein the drill bit is guided through the base plate hole when the top plate is pushed downwardly.

2. The apparatus of claim 1 wherein the top plate has a nut fixed proximate the top plate hole and the rotation member shaft is threaded, such that the rotation member threaded shaft extends through the hole and is threaded through the fixed nut.

3. The apparatus of claim 1 wherein the top plate has a threaded hole and the rotation member shaft is threaded, such that the rotation member threaded shaft extends through the hole and is threaded through the threaded hole.

4. The apparatus of claim 1 wherein the alignment clamp is attached to the center plate with threaded fasteners.

5. The apparatus of claim 1 wherein the center plate notch is generally semi-circular and the alignment clamp notch is generally semi-circular, such that the notches form a circular with a diameter larger than the drill chuck diameter and smaller than the drill housing diameter.

6. The apparatus of claim 1 wherein the alignment clamp is hinged and latched to the center plate such that the alignment clamp swings open for insertion of the power drill chuck.

7. The apparatus of claim 1 wherein the alignment clamp has a compressible element on at least part of the alignment clamp notch.

8. The apparatus of claim 1 wherein the alignment clamp has a compressible element on at least part of the alignment clamp notch and the center plate has a compressible element on at least part of the center plate notch.

9. The apparatus of claim 1 wherein the stabilizing clamp has a compressible element covering at least part of the stabilizing clamp recess.

* * * * *